US010378125B2

(12) United States Patent
Kohl et al.

(10) Patent No.: US 10,378,125 B2
(45) Date of Patent: Aug. 13, 2019

(54) METHOD AND DEVICE FOR PROCESSING CARBON FIBER STRANDS

(71) Applicant: Bayerische Motoren Werke Aktiengesellschaft, Munich (DE)

(72) Inventors: Eberhard Kohl, Coswig (DE); Franz Maidl, Wallerfing (DE); Hanno Pfitzer, Furth (DE); Falco Hollmann, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 794 days.

(21) Appl. No.: 14/934,423

(22) Filed: Nov. 6, 2015

(65) Prior Publication Data

US 2016/0060794 A1 Mar. 3, 2016

Related U.S. Application Data

(63) Continuation of application No. PCT/EP2014/057503, filed on Apr. 14, 2014.

(30) Foreign Application Priority Data

May 7, 2013 (DE) ........................ 10 2013 208 426

(51) Int. Cl.

| | |
|---|---|
| ***D01D 10/02*** | (2006.01) |
| ***D01F 9/32*** | (2006.01) |
| ***H05B 3/00*** | (2006.01) |
| ***D01D 11/02*** | (2006.01) |
| *B29C 35/02* | (2006.01) |

(52) U.S. Cl.

CPC ............... *D01F 9/32* (2013.01); *D01D 10/02* (2013.01); *D01D 11/02* (2013.01); *H05B 3/0009* (2013.01); *B29C 2035/0211* (2013.01); *H05B 3/0004* (2013.01)

(58) Field of Classification Search

CPC ...... H05B 3/0004; H05B 3/0009; H05B 3/03; H05B 3/023; D01F 9/32; D01D 10/02; D01D 11/02

See application file for complete search history.

(56) References Cited

U.S. PATENT DOCUMENTS

| | | | | |
|---|---|---|---|---|
| 3,612,819 A | 10/1971 | Gibson | | |
| 7,536,761 B2 * | 5/2009 | Nestler | ..................... | D02J 1/18 28/220 |

(Continued)

FOREIGN PATENT DOCUMENTS

| | | |
|---|---|---|
| CN | 88 1 00656 A | 8/1988 |
| CN | 1032042 A | 3/1989 |

(Continued)

OTHER PUBLICATIONS

Chinese Office Action issued in counterpart Chinese Application No. 201480021352.3 dated Jul. 5, 2016 with English-language translation (nineteen (19) pages).

(Continued)

*Primary Examiner* — Joseph M Pelham
(74) *Attorney, Agent, or Firm* — Crowell & Moring LLP

(57) ABSTRACT

A method and a device are disclosed for heating carbon fiber strands. The method heats a carbon fiber strand by supplying an electric current to the carbon fiber strand. The device is designed to carry out the method.

10 Claims, 3 Drawing Sheets

(56) References Cited

U.S. PATENT DOCUMENTS

| | | | | |
|---|---|---|---|---|
| 8,191,215 B2 * | 6/2012 | Meyer | D02J 1/18 | 28/219 |
| 8,568,549 B2 * | 10/2013 | Meyer | B29B 11/16 | 156/256 |
| 8,658,281 B2 * | 2/2014 | Kim | B82Y 30/00 | 423/447.2 |
| 2005/0140064 A1 | 6/2005 | Jorn et al. | | |
| 2007/0101564 A1 | 5/2007 | Nestler et al. | | |
| 2010/0074834 A1 | 3/2010 | Kim | | |
| 2011/0108188 A1 | 5/2011 | Lengsfeld | | |
| 2016/0060794 A1 * | 3/2016 | Kohl | D01D 10/02 | 219/388 |
| 2016/0221789 A1 * | 8/2016 | Borger | B65H 51/005 | |

FOREIGN PATENT DOCUMENTS

| | | |
|---|---|---|
| CN | 2214421 Y | 12/1995 |
| CN | 1958895 A | 5/2007 |
| DE | 103 53 070 A1 | 6/2005 |
| DE | 10 2008 020 564 A1 | 11/2009 |
| EP | 1 783 252 A1 | 5/2007 |
| FR | 1.134.871 A | 4/1957 |
| GB | 770653 A | 3/1957 |
| GB | 1 217 170 A | 12/1970 |
| WO | WO 02/30657 A1 | 4/2002 |

OTHER PUBLICATIONS

International Search Report (PCT/ISA/210) issued in PCT Application No. PCT/EP2014/057503 dated Jul. 16, 2014 with English-language translation (four (4) pages).

German Search Report issued in counterpart German Application No. DE 10 2013 208 426.9 dated Mar. 24, 2014 with partial English-language translation (ten (10) pages).

German-language Office Action issued in European Application No. 14 718 041.8 dated Feb. 21, 2018.

Edie et al., "Thermoplastic Coating of Carbon Fibers," Advances in Thermoplastic Matrix Composite Materials, ASTM STP 1044, Ed., American Society for Testing and Materials, Philadelphia, PA, USA, Jan. 1, 1989, pp. 50-61, XP009503417A.

Edie et al., "Thermoplastic Coating of Carbon Fibers," Annual Report, 1888-1889, NASA Contractor Report, NASA Contract CR-185047, Jan. 1, 1989, pp. 1-28, https://ntrs.nasa.gov/archive/nasa/casi.ntrs.nasa.gov.19890015117.pdf, XP055373109.

* cited by examiner

METHOD AND DEVICE FOR PROCESSING CARBON FIBER STRANDS

CROSS REFERENCE TO RELATED APPLICATIONS

This application is a continuation of PCT International Application No. PCT/EP2014/057503, filed Apr. 14, 2014, which claims priority under 35 U.S.C. § 119 from German Patent Application No. 10 2013 208 426.9, filed May 7, 2013, the entire disclosures of which are herein expressly incorporated by reference.

BACKGROUND AND SUMMARY OF THE INVENTION

The present invention relates to a process and a device for processing carbon fiber strands.

For producing semi-finished carbon fiber products, so-called rovings are used, which are fiber strands, fiber bundles or multi-filament yarns consisting of several thousand or several tens of thousands of filaments (continuous fibers) arranged parallel or with a slight twist (false twist for preventing a coming-apart), which are traded on spools, rolls or drums and are continuously pulled off for the processing. These are called on-line methods in contrast to the discontinuous manual placing. The diameter of each individual filament is usually between 5 and 8 μm.

In the case of the on-line processing of carbon fiber strands, it is often necessary to heat up the starting product (the carbon fiber) and partially raise it to high temperatures. It is known to accomplish the heating by the use of furnaces, Bunsen burners, heat lamps or other radiation sources. The fiber is guided through the heat source at the production speed, in which case the heating of the fiber material is to be set by varying the temperature and the speed. However, in these processes, the heating-through of the fiber material is often not sufficiently homogeneous. This may result in fluctuations along the manufacturing process and thereby in differences in the product characteristics of the semi-finished product. The heat input may also be too spotty or too intensive on the whole, which may damage the fibers. Because of high heat losses, the energy efficiency of the above-mentioned methods may also not be sufficient.

It is an object of the present invention to provide a method and a device for processing carbon fiber strands which at least partially eliminates the disadvantages of the prior art. In particular, it is an object of the present invention to provide an easily controllable method and a device for processing carbon fiber strands, which permits a homogenous and smooth heating-through of the fiber material in a carbon fiber strand, so that fiber damage can be avoided. It is a further object of the invention to reduce the energy expenditures for the heating of the fiber material.

At least in partial aspects, the above-mentioned object is achieved by a method and a device according to embodiments of the invention. The characteristics and details described in connection with the device according to the invention also apply to the system according to the invention, to the facility according to the invention, and to the method according to the invention and, in each case, vice-versa and alternately, so that, with respect to the disclosure, reference is made or can be made, always alternatively, to the individual aspects of the invention.

A first aspect of the present invention relates to a method of heating a continuously conveyed carbon fiber strand.

According to the invention, the heating takes place by feeding electric current into the carbon fiber strand.

A carbon fiber strand is a strand of untwisted or only minimally twisted quasi-continuous filaments of carbon. When the heating of the carbon fiber strand takes place by feeding electric current into the carbon fiber strand, the temperature control of the filaments takes place from inside the material, so that heat can be fed into the carbon fiber strand in a uniform and homogenous and, therefore, smooth manner. The temperature gradient in the fiber is inverse to a heating from the outside.

When the carbon fiber strand is spread open before the feeding of electric current, a contacting of the carbon fiber strand can be improved because the fiber filaments are distribute over a broad area.

In a preferred embodiment, the heating takes place to a temperature which corresponds at least to a softening temperature of a coating or impregnation situated on fibers of the carbon fiber strand. When the coating of the fibers is present in a softened (therefore particularly in a molten) condition, a subsequent production of composite parts will be facilitated because the coating may, for example, contain a matrix material for the fiber composite.

In a particularly preferred embodiment, the heating takes place to a temperature which corresponds at least to a disintegration temperature of a coating situated on fibers of the carbon fiber strand. As a result, a coating present in the delivery condition can be removed if the subsequent processing steps require no or a different coating.

In a preferred further development, a final temperature of the carbon fiber strand achieved by the heating will be controlled or automatically controlled by at least one of the following measures:

- Varying of a voltage at which the electric current is fed;
- varying of a protective resistor;
- varying of a withdrawal speed of the carbon fiber strand;
- varying of a spacing of current feeding points.

This results in a simple controllability.

A further aspect of the present invention relates to a heating device for heating a continuously conveyed carbon fiber strand. The heating device according to the invention is designed for the implementation of the above-described method.

In a preferred embodiment, the heating device has a voltage source and at least two contact elements connected with respective poles of the voltage source and insulated from the environment. The contact elements are designed for contacting the carbon fiber strand such that a closed circuit is formed with the voltage source. The contact elements may have a contact roller and/or a sliding contact. According to the invention, a contact roll may also be understood to be a contact roller. Depending on the requirement, the contact roller may have a convex or concave design.

In particular, the heating device has a control unit which is designed for triggering the voltage source.

In a preferred further development, a temperature sensor is provided for measuring a final temperature of the carbon fiber strand. The control unit is designed for receiving an output signal of the temperature sensor and for automatically controlling the final temperature of the carbon fiber strand by applying at least one of the following measures:

- Triggering the voltage source in order to vary an output voltage of the voltage source;
- triggering a variable resistor in order to vary a voltage between the contact elements;
- triggering a servo drive in order to vary the spacing of contact elements;

triggering a driving device in order to vary the withdrawal speed of the carbon fiber strand.

Other objects, advantages and novel features of the present invention will become apparent from the following detailed description of one or more preferred embodiments when considered in conjunction with the accompanying drawings.

DETAILED DESCRIPTION OF THE DRAWINGS

In the following, embodiments of the invention will be described by way of the attached drawings. Identical or similar components in several figures are in each case provided with identical or similar reference symbols. Components and characteristics, purposes and effects, which are described with respect to one embodiment, unless explicitly and clearly excluded, are assumed to be applicable in every other embodiment and should also be assumed to be disclosed with respect to the concerned other embodiment, if they are not explicitly shown and/or described there. The drawings are to be understood to be schematic and indicate no limitations with respect to concrete dimensions or proportions in size, unless explicitly described.

<Heating Device with Roll Contacting>

Figure 1:
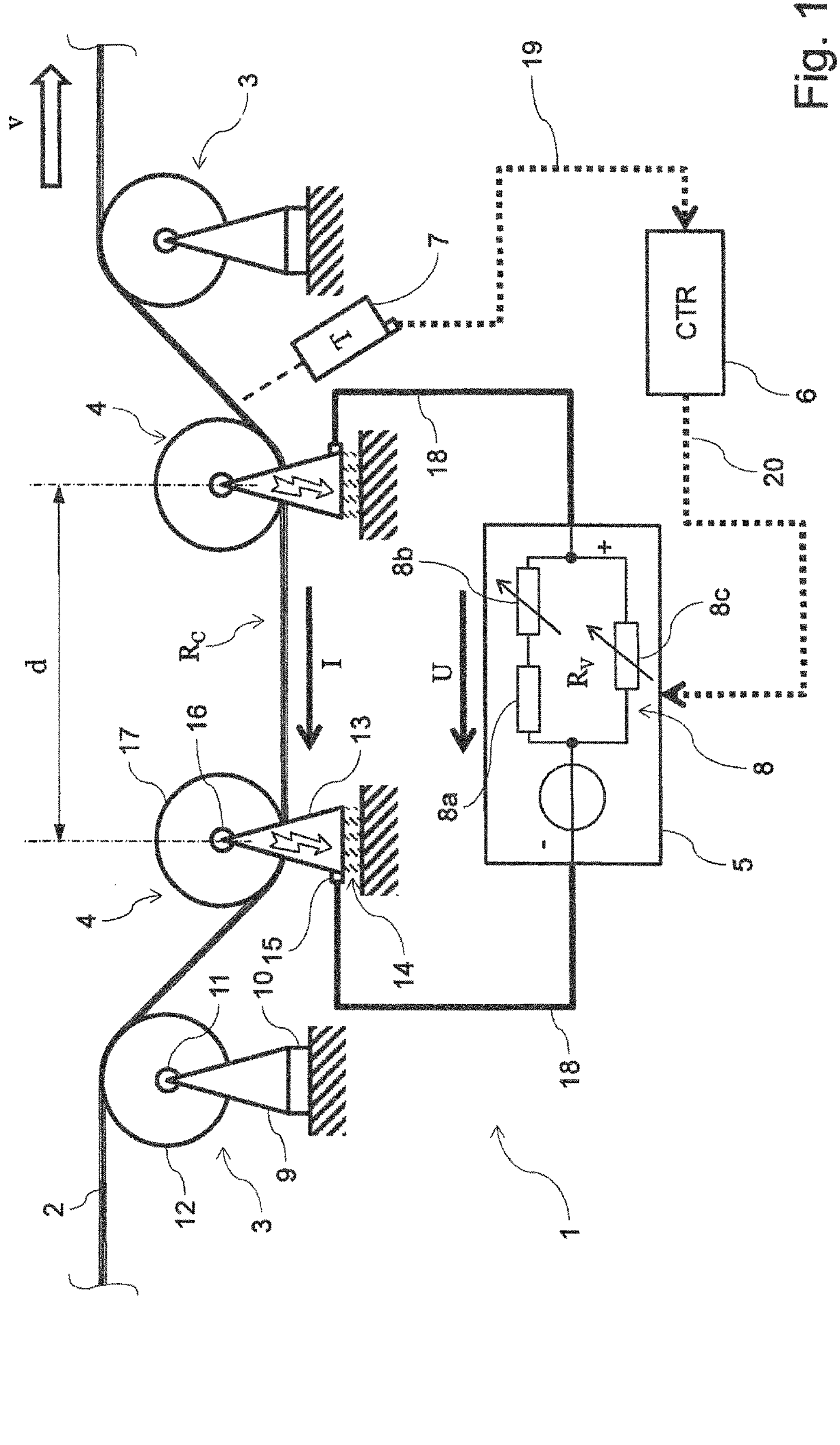
FIG. 1 is a schematic representation of a heating device according to an embodiment of the present invention.

FIG. 1 illustrates in a schematic representation a heating device 1 for heating a carbon fiber strand 2 according to a first embodiment of the present invention. The heating device 1 is part of a conveying device (not shown in detail), has one or more unwinding rollers, one or more guiding, storage and pull-off rollers, and is particularly designed for withdrawing the carbon fiber strand 2 from the unwinding roller and continuously delivering it at a pull-off speed v.

The heating device 1 has two guiding elements 3, two contacting elements 4, a voltage source 5, a control unit 6 and a temperature sensor 7.

The voltage source 5 has a controllable or automatically controllable protective resistor 8 and is designed for providing a voltage U. The protective resistor 8 is implemented by a voltage divider circuit, which has a fixed internal resistor 8*a*, a variable series resistor 8*b*, and a variable parallel resistor 8*c* connected in parallel with the resistors 8*a*, 8*b*. The voltage source 5 is designed for automatically controlling a voltage set for it, by varying the protective resistor 8 (of the variable resistors 8*b*, 8*c*).

Each of the guiding elements 3 has a bearing block 9, which is fastened by means of a fastening device 10 to a system frame (not defined in detail) or to a system floor. The bearing block 9 has a bearing 11, which rotatably supports a deflection pulley 12.

Each of the contacting elements 4 has a housing 13 which is fastened to the system frame or system floor by way of a fastening device 14. The fastening device 14 has an electrically insulating design and can, therefore, also be called an insulation 14. A connection 15 for connecting a connection cable is also mounted at the housing 13. The housing 13 has a bearing 16, which rotatably supports a contact roller 17. The contacting element 4 is designed such that the connection 15 is electrically connected with the contact roller 17. For this purpose, the housing 13, the bearing 16 and the contact roller 17 may be constructed of an electrically conductive material and be mutually connected in an electrically conductive manner. When a potential-conducting connection contact (not indicated in detail) of the connection 15 is then connected with the housing 13, the potential applied to the connection contact is then also applied to the contact roller 17. As an alternative, a wiping, sliding, rolling or other contact (not indicated in detail) can be applied to the contact roller 17 and can be connected with the connection contact, so that the potential applied to the connection contact 15 is also applied to the contact roller 17.

Each of the contacting elements 4 is connected with the voltage source 5 by way of its connection 15 and a connection cable 18. Accordingly, when voltage losses are disregarded, the voltage U provided by the voltage source 5 is applied between the contact rollers 17 of the contacting elements 4.

The carbon fiber strand 2 is guided by way of the deflecting pulleys 12 and the contact rollers 17 such that the carbon fiber strand 2 is free between the contact rollers 17. A free length of the carbon fiber strand 2 between the contact rollers 17 is called a contact clearance d. By means of known devices not indicated here in detail, the carbon fiber strand 2 is continuously conveyed in the pull-off direction (from the left to the right in the figure) at a pull-off speed v.

Since the carbon fiber strand 2 is guided by way of the contact rollers 17 and is free in-between, and since the carbon fibers contained in the carbon fiber strand 2 are a conductive material, the voltage source 5 is short-circuited by way of the carbon fiber strand 2. A current I therefore flows from the one contact roller 17 through the carbon fiber strand 2 to the other contact roller 17. As a result, the carbon fiber strand 2 between the contact rollers 17 is heated by the flowing current according to the heated filament principle.

By way of a measuring line 19, the voltage source 5 receives a temperature signal from a temperature sensor 7. Without limiting the generality, the temperature sensor 7 is an infrared sensor, which scans the carbon fiber strand 2 downstream of the second contacting element 4 and emits a temperature signal corresponding to the measured temperature T of the carbon fiber strand 2. By means of the measured temperature T of the carbon fiber strand 2 represented by the temperature signal, the control unit 6 determines the voltage U to be set and, by way of a control line 20, outputs to the voltage source 5 a control signal representing the voltage U to be set. In an embodiment, the voltage source 5 outputs a voltage signal corresponding to the supplied voltage to the control unit 6; from which the control unit 6 calculates the resistance value of the protective resistor 8 or of the variable resistors 8*b*, 8*c* that is to be set, and outputs a corresponding control signal to the voltage source 5. As a result, an automatic temperature control is implemented such that the voltage U of the voltage source 5 is varied by way of the measured temperature T and a desired value of the temperature T (which can be manually set at the control unit 6 or can be predefined by way of a central system control).

<Preprocessing with Current Temperature Control>

Figure 2:
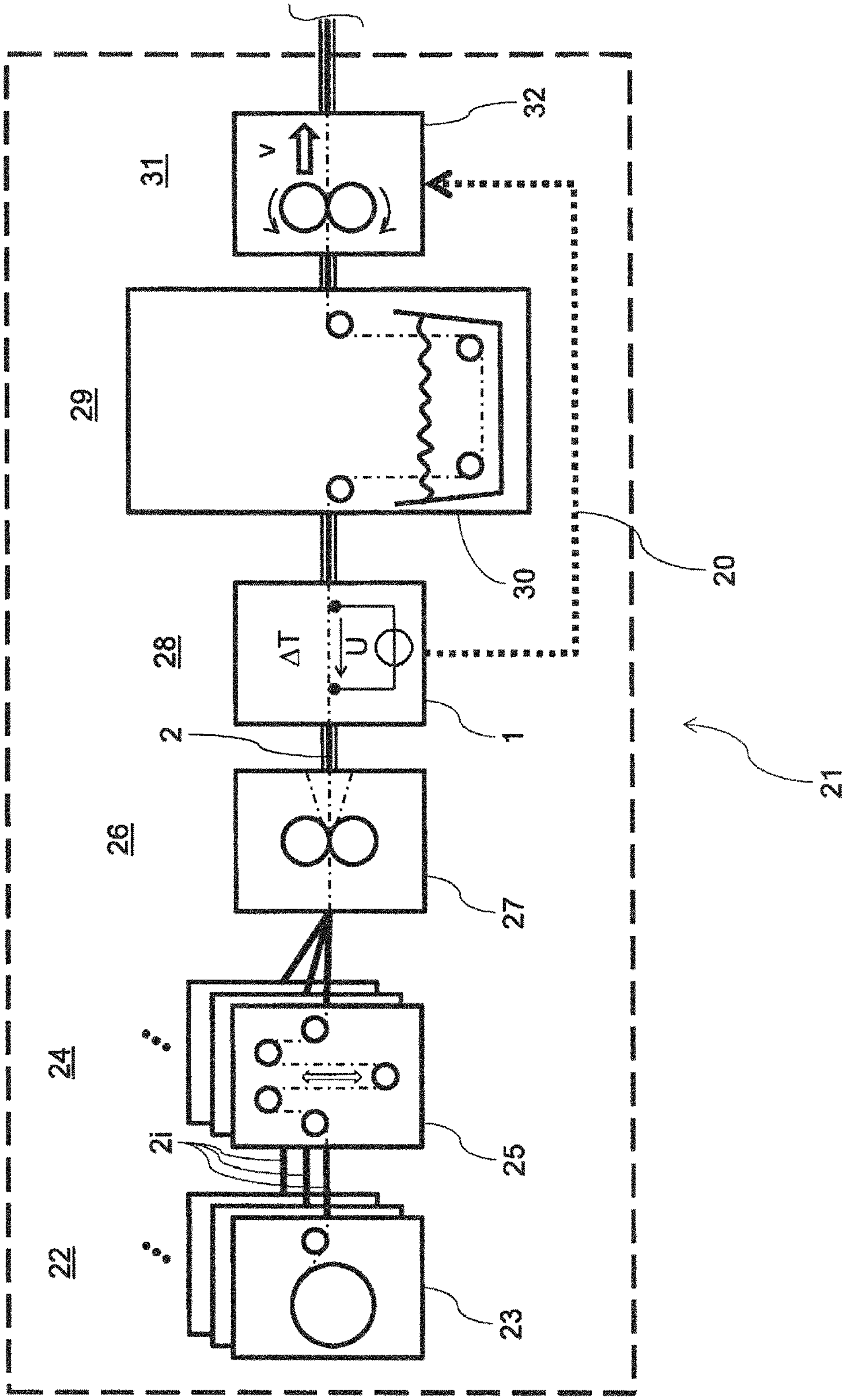
FIG. 2 is a schematic representation of a carbon fiber preprocessing system having a heating device according to a further embodiment of the present invention.

FIG. 2 is a block diagram of a carbon fiber preprocessing system 21 as a further embodiment of the present invention. The carbon fiber preprocessing system 21 is provided for the preprocessing and conveyance of a carbon fiber strand 2 combined of several rovings 2*i* for the additional feeding to a further processing system. The further processing system may, for example, include a weaving device for the preparation of a woven for the preparation of prepegs, a pultrusion device for the production of tube-shaped semifinished products, a fiber shredding machine for producing fiber mats with short or long fibers, etc.

In the following, the individual components of the carbon fiber preprocessing system 21 will be described.

A winding station 22 has a plurality of wind-off devices 23. Each wind-off device 23 carries a spool having a roving 2*i*.

After the winding-off from the respective wind-off device 23, the rovings 2*i* are fed to a storage station 24, in which each roving 2*i* is fed to a self-aligning roller storage device 25. Each self-aligning roller storage device 25 has several fixed rollers and at least one movable (reciprocating) roller and has the purpose of compensating fluctuations in the pull-off speed v and of providing a predefined fiber tension.

After the storage station 24, the rovings 2*i* are fed to a fiber spreading station 26. In the fiber spreading station 26, the rovings are spread open between two calender rollers of a calendering unit 27, and the spread-open fibers of all rovings are brought together to form a single band-shaped carbon-fiber strand 2.

The carbon fiber strand 2 is now fed to a heating station 28 which, as described above, has a heating device 1. By means of the heating device 1, the carbon fiber strand 2 is heated to a temperature which corresponds to a disintegration temperature $T_Z$ of a coating situated on the fibers. The coating is thereby removed from the carbon fiber strand 2. As a result of the fact that the carbon fiber strand 2 is already unraveled and is fed in a band-shaped manner, a good electric contact of the individual filaments with the contact rollers 12 (compare FIG. 1) of the heating device 1 can be implemented.

After the removal of the fiber coating in the temperature control station 28, the carbon fiber strand 2 is fed to an impregnation station 29. The impregnation station 29 has a coating bath 30, through which the carbon fiber strand 2 is guided. In the coating bath 30, the filaments of the carbon fiber strand 2 are provided with a new coating, which is adapted to the further processing. Instead of the coating bath 30, a spraying device for spraying the carbon fiber strand 2 may be provided.

After the new coating in the impregnation station 29, the carbon fiber strand 2 will be fed to a withdrawing station 31, which has a driving device 32 for the carbon fiber strand 2. The driving device 32 has a pair of driving rollers for withdrawing the carbon fiber strand 2 at the pull-off speed v.

By way of a control line 20, the control unit 6 (compare FIG. 1) can also generate and output or send control signals for the driving device 32 for varying the pull-off speed v as a function of the achieved final temperature T of the carbon fiber strand 2.

As a modification, several heating devices 1, instead of a single heating device 1, may be provided in the temperature control station 28 for the individual temperature control of the carbon fiber strands 2. In this case, several calendering units 27 and pull-off devices 32 will also be provided. Several impregnation baths 30 may then also be provided or the impregnation bath may be equipped for the guiding-through of several carbon fiber strands.

For explanatory purposes, the presentation and above description of the preprocessing system 21 is considerably simplified and diagrammed. The arrangement of the different stations may be adapted to the respective requirements of further processing. Additional temperature control stations 28 and impregnation stations 29 may be provided in order to carry out, for example, after the new coating, also one or more coatings, for example, with a fiber matrix for producing prepregs or formed bodies, with an optimally temperature-controlled carbon fiber strand 2. In some cases, the removal of the coating of the delivery state may not be necessary. A heating to the softening temperature $T_W$ or melting temperature $T_S$ of a fiber coating (impregnation) can therefore be provided in addition to or instead of the heating to the disintegration temperature $T_Z$, in order to facilitate the subsequent processing. It is also contemplated to provide a heating stage for drying the fibers after an impregnation.

Without limiting the generality, a melting temperature $T_S \approx 250°$ C. can be assumed for polyamide coatings; a melting temperature of $T_S \approx 360°$ C. can be assumed for high-temperature polymer coatings. For preparing the lamination, it may make sense to use a softening temperature $T_W$ far below these values as a basis. Without limiting the generality, the disintegration temperature $T_Z$ of the coating may be up to 400° C.

<Heating Device with Sliding Contacting>

Figure 3:
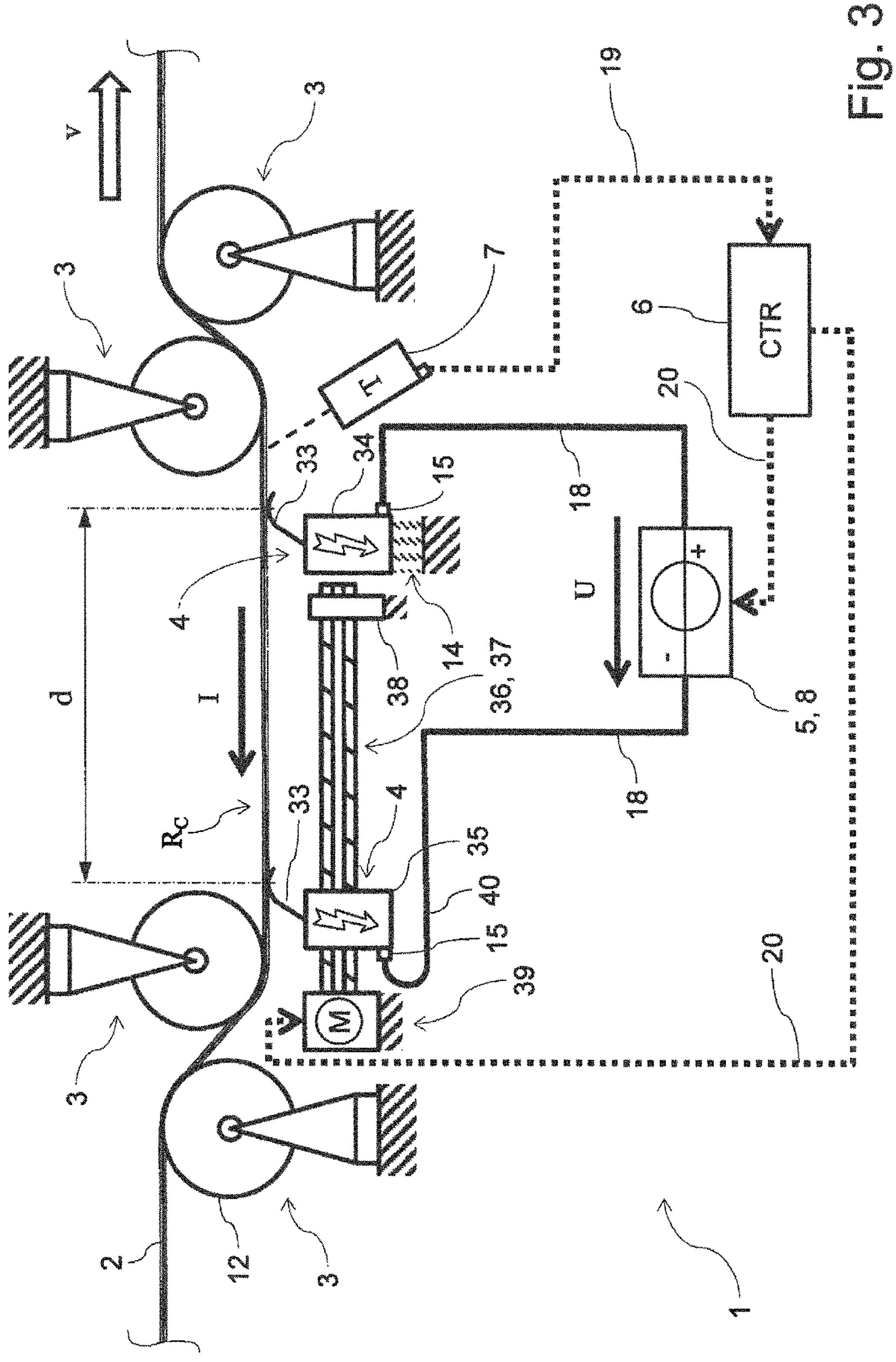
FIG. 3 is a schematic representation of a heating device according to a further embodiment of the present invention.

FIG. 3 illustrates a heating device of a further embodiment of the present invention in a schematic representation. The present embodiment is a modification of the embodiment of FIG. 1 so that reference is made to the full extent of the respective descriptions, unless the following description of the deviations stands in the way.

In this embodiment, the carbon fiber strand 2 is guided by way of two pairs of currentless guiding elements 3 in order to provide a free fiber strand section with a defined pretension. Although not illustrated in detail, at least one of the guiding elements 3 may be designed for the application of a defined tensioning force to the carbon fiber strand 2 in that, for example, the pertaining deflecting roller 12 is spring-mounted.

Deviating from the first embodiment, the two contacting elements 4 have no contact rollers, but sliding contacts 33, whose spacing corresponds to the contact spacing d.

In one case (right contacting element 4 in the figure), the sliding contact 33 is accommodated in a fixed housing 34 which, by way of an insulation 14, is fastened to or in an equipment frame or housing not indicated in detail. By way of current connection 15 of the contacting element 4, the sliding contact 33 is connected with a pole of the voltage source 5.

The other contacting element 4 (on the left in the figure) has a rotor housing 35, in which a further sliding contact 33 is accommodated. The rotor housing 35 is displaceably disposed in two parallel-arranged sliding rails and is supported at a spindle 37. The sliding rails 36 and the spindle 37 are electrically insulated by devices not shown in detail, such as guiding elements made of PTFE or another insulating material, with respect to the sliding contact 33. The sliding rails 36 and the spindle 37 are disposed on a (free) side in a bearing block 38. On another (driven) end, the sliding rails 36 are fastened to a housing of a servo drive 39. The servo drive 39 has an electric motor, particularly a multiphase motor, which drives the spindle 37. The spindle 37 will turn when the servo drive 39 is actuated and will displace the contacting element 4 on the sliding rails 36. In this manner, the contact spacing d between contact points of the sliding contacts 33 can be varied. By way of a current connection of the contacting element 4, the sliding contact 33 is connected with a pole of the voltage source 5, in which case the pertaining connection cable is placed in a loop 40 on the side of the movable contacting element 4 or is guided in a link chain guide.

The sliding contacts 33 have a spring-mounted design in order to follow within certain limits a course of the carbon fiber strand 2 predefined by a tension of the carbon fiber strand 2.

<Control Criteria>

For deriving suitable control strategies, the heating of the carbon fiber strand 2 will first be acquired by formulas in connection with relevant design parameters.

The current I flowing in the carbon fiber strand 2 depends among other factors on an ohmic resistance $R_c$ of the (free part of the) carbon fiber strand 2. Ohm's Law (1) $U=R_c\times I$ or (2) I=U/Rc will apply. The ohmic resistance $R_c$ can be calculated from the definition of the specific resistance (3) $p_{el}=R\times A/L$, A indicating the cross-sectional area of all filaments of the carbon fiber strand 2, L indicating the length of the conductor, which can be equaled with the free length d ((4)L=d). This results in the resistance of the carbon fiber strand 2 at $$R_c=p_{el}\times d/A; \tag{5}$$

i.e. the following applies:

$$I=A/p_{el}\times U/d. \tag{6}$$

When z is the number of individual filaments in one roving, n is the number of rovings for forming the carbon fiber strand 2 and $d_f$ is the filament diameter of each individual filament in a roving, the total cross-sectional area will be (7) $A=\pi/4\times z\times n\times d_f^2$. For conventional rovings, the filament diameter $d_f=5\ldots8$ μm at a filament number of z=1,000 . . . 50,000. For example, n=70 . . . 80 roving spools are brought together in one facility.

On the one hand, the heating ΔT of the carbon fiber strand 2 depends on the specific heat capacity c for carbon fibers, on the mass m of the strand to be heated and on the fed thermal energy ΔQ, and can be indicated according to the definition of the specific heat capacity (8) $c=\Delta Q/(m\times\Delta T)$ by the equation (9) $\Delta T=\Delta Q/(m\times c)$. The mass is obtained from the definition of the specific weight (mass density) $p_m$ at (10) $m=p_m\times A\times d$, A again being the cross-sectional area and d being the contact length of the carbon fiber strand 2.

The heat quantity ΔQ fed into the carbon fiber strand 2 may be expressed as the product of an effective heating power $P_{eff}$ and a current flow time or contact time Δt as (11) $\Delta Q=P_{eff}\times\Delta t$, the contact time Δt being obtained with the contact spacing d and the pull-off speed v at (12) Δt=d/v. (13) $\Delta Q=P_{eff}\times d/v$ therefore applies. Assuming that the effective heating power $P_{eff}$ of the electric power (14) $P_{el}=U\times I$ is proportional to a factor $\eta_q$, which can also be called a heat input efficiency, the fed heat quantity can be indicated by the equation (15) $\Delta Q=\eta_q\times U\times I\times d/v$. Finally, the heating ΔT of the carbon fiber strand 2 is obtained from equation (9) by using the equations (15), (10) and (6) after a brief conversion to $$\Delta T=\eta_q/(p_{el}\times c\times p_m)\times U^2/(d\times v). \tag{16}$$

In the above equation for the heating ΔT of the carbon fiber strand 2, the first quotient contains only constant (or temperature-dependent) material values and efficiencies. The second quotient contains process parameters which can be used for controlling the heating.

Here, it should be noted that the heat input efficiency $\eta_q$ also depends on constructively influenceable conditions, such as a heat elimination by convection (moved air, fresh air), heat absorption or heat reflection by surrounding walls or components, etc. and, for example, also by encapsulation or ventilation. Furthermore, the electric efficiency $\eta_q$ may also comprise electric power losses, load losses at the transition between the carbon fiber strand 2 and the contact rollers 17 or sliding contacts 33, static discharge losses, etc.

Guiding principles for contemplated control approaches are indicated in the above equation:

- A variation of the voltage U of the voltage source 5 has the greatest influence on the heating-up of the carbon fiber strand 2, because the temperature increase ΔT is a quadratic function of the voltage U.
- An increasing of the contact spacing d causes a reduction of the heating-up because the temperature increase ΔT is inversely proportional to the contact spacing d.
- An increasing of the pull-off speed v also causes a lower heating because the temperature increase ΔT is also inversely proportional to the pull-off speed v.

Numerical Example

For designing the current supply, it is important to know the required voltages and current intensities. For the purpose of a simple scalability, a heating by 100° C. (ΔT=100 K) will be considered in the following for a carbon fiber strand 2 (n=1) with 1,000 individual filaments (z=1,000) of a diameter of $d_f=8$ μm respectively. It is further assumed that the contact length d=2 m and the pull-off speed is v=0.5 m/s.

For estimating the necessary voltage in order to achieve a predefined temperature increase, the above equation (16) can be resolved according to U; it then becomes:

$$U=((p_{el}\times c\times p_m)/(\eta_q\times\eta_{el})\times\Delta T\times d\times v)^{1/2}. \tag{17}$$

The material values for carbon fibers are indicated in the literature with c=710 J/(kg K), $p_{el}=16\ \Omega\text{mm}^2/\text{m}$ and $p_m=1.8$ g/cm$^3$ (Wikipedia Entry "Carbon Fibers", Retrieval on Mar. 10, 2013).

From Equation (17), for a heating by 100° C. (=100 K), a required voltage is therefore obtained of $$U_{100}=\left[(16\ \Omega\ \text{mm}^2/\text{m}\times710\ \text{J/(kg K)}\times1.8\ \text{g/cm}^3)/(\eta_q\times\eta_{el})\times100\ \text{K}\times2\ \text{m}\times0.5\ \text{m/s}\right]^{1/2}$$

$$U_{100}=[\eta_q\times\eta_{el}]^{-1/2}\times\left[(16\times10^{-6}\times710\times1.8\times10^{-3}/10^{-6}\times100\times2\times0.5\right]^{1/2}\times\{(\text{kg m}^2/(\text{A}^2\text{s}^3))\times(\text{m}^2/\text{m})\}\times\{(\text{kg m}^2)/\text{s}^2)/(\text{kg}\times\text{K})\}\times\text{kg/m}^3\times\text{K}\times\text{m}\times(\text{m/s})]^{1/2},$$

therefore approximately $U_{100}=(\eta_q\times\eta_{el})^{-1/2}\times45$ V.

With Equations (6) and (7), the required current intensity is therefore obtained at $$I=\pi/4\times(z\times n\times d_f^2/p_{el})\times U/d. \tag{18}$$

For a heating by 100° C. per 1,000 individual filaments respectively with the highest defined filament strength (8 μm) from Equation (18), a current intensity is further obtained by means of the above-mentioned numerical values, which is approximately $$I_{100/1000}=\pi/4\times(100.000\times(8\ \mu\text{m})^2/16\ \Omega\ \text{mm}^2/\text{m})\times(\eta_q\times\eta_{el})^{-1/2}\times45\ \text{V}/2\ \text{m}$$

$$=\pi/4\times(100.000\times64\times10^{-12}/(16\times10^{-6})\times(\eta_q\times\eta_{elk})^{-1/2}\times45/2\times$$

-continued $$[m^2/((kg\ m^2)/(A^2 s^3)\times m^2/m)\times((kg\ m^2)/(A\ s^3))/m],$$

therefore approximately $I_{100/1000}=(\eta_{el}\times\eta_q)^{-1/2}\times 0.07$ A.

Therefore, for the heating of 1,000 individual filaments of a diameter of 8 μm respectively by 100 K, an electric power of $$P_{100/1000}=U_{100}\times I_{100/1000}=(\eta_{el}\times\eta_q)^{-1}\times 3.2\text{ W}$$

would have to be generated.

It is understood that the above derivation is based on an analogy for the static case of a constant energizing of a stationary conductor for a fixed current flow time, does not take into account dynamic effects and other marginal conditions and is therefore only suitable for qualitative considerations.

For example, for precise computations, particularly for the specific resistance $p_{el}$, a temperature dependency would also have to be taken into account, which can be expressed by the equation (19) $p_{el}(T)=p_{el}(T_0)\times(1+\alpha\times(T-T_0))$ with $\alpha=-0.2/1{,}000$, $T_0=20°$ C. (for carbon) (Wikipedia Entry "Specific Resistance" (or "resistivity" trl.), Retrieval on Mar. 10, 2013).

The invention, which is defined by the claims, is not limited by the above-indicated set of formulas and the numerical data determined therefrom.

<Further Modifications>

The invention was described above by use of preferred embodiments—variant embodiments, alternative embodiments and modifications—and was illustrated in the figures. These descriptions and representations are purely schematic and do not limit the scope of protection of the claims, but are used only for depicting corresponding examples. It is understood that the invention can be implemented and modified in multiple fashions without leaving the scope of protection of the claims.

The voltage source 5 can therefore also be an alternating-voltage source.

In the third embodiment, the servo drive may also have a different design, for example, as a hydraulic cylinder or as a pinion with a rack rail, in which case the pinion drive would be arranged on the rotor housing 35.

For implementing different contacting paths, more than two contacting elements 4 may be provided, which can optionally contact the carbon fiber strand 2 at different points.

LIST OF REFERENCE SYMBOLS

1 Heating device
2 Carbon fiber strand
3 Guiding element
4 Contacting element
5 Voltage source
6 Control unit
7 Temperature sensor
8 Voltage divider circuit (protective resistor)
**8*a*** Fixed internal resistor
**8*b*** Variable series resistor
**8*c*** Variable parallel resistor
9 Bearing block
10 Fastening
11 Bearing
12 Deflecting roller
13 Housing
14 Insulation/fastening
15 Connection
16 Bearing
17 Contact roller
18 Connection cable
19 Measuring line
20 Control line
21 Carbon fiber preprocessing system
22 Winding station
23 Wind-off device
24 Storage station
25 Self-aligning roller storage device
26 Fiber spreading station
27 Calendering unit
28 Temperature control station
29 Impregnation station
30 Impregnation bath (coating bath)
31 Pull-off station
32 Driving device
33 Fixed housing
34 Sliding contact
35 Rotor housing
36 Sliding rail
37 Spindle
38 Bearing block
39 Servo drive
40 Cable loop (link chain guide)
c Specific heat capacity
d Contact spacing
$d_f$ Filament diameter
m Mass
n Number of rovings
Δt Contact time
v Pull-off speed
z Number of individual filaments in the roving
A Cross-sectional surface
I Electric current intensity
$I_{100/1000}$ Current intensity for heating 1,000 filaments by 100° C.
$P_{eff}$ Effective heating power
$P_{100/1000}$ Electric power for heating 1,000 filaments by 100° C.
ΔQ Heat quantity
$R_c$ Resistance of the carbon fiber strand
$R_v$ Protective resistor
T Temperature (final temperature)
$T_0$ Reference temperature
$T_S$ Melting temperature of fiber coating/impregnation
$T_W$ Softening temperature of fiber coating/impregnation
$T_Z$ Disintegration temperature of fiber coating impregnation
ΔT Temperature difference
U Electric voltage
$U_{100}$ Voltage for the heating to 100° C.
α Linear resistance temperature coefficient
$\eta_{el}$ Electric efficiency
$\eta_q$ Heat input efficiency
$p_{el}$ Specific electric resistance
$p_m$ Specific density (mass density)

The above-indicated list is an integral component of the specification.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of heating a carbon fiber strand, the method comprising the acts of:

continuously conveying the carbon fiber strand;

spreading open the carbon fiber strand until the fiber strand is unraveled; and heating the continuously conveyed carbon fiber strand by feeding electric current into the carbon fiber strand.

2. The method according to claim 1, wherein the act of heating the carbon fiber strand is carried out at least to a softening temperature $T_w$ of a coating or an impregnation on fibers of the carbon fiber strand.

3. The method according to claim 2, wherein the heating is carried out at least to a disintegration temperature $T_z$ of the coating on the fibers of the carbon fiber strand.

4. The method according to claim 1, further comprising the act of:

controlling a temperature of the carbon fiber strand achieved by the heating by way of at least one of the following measures:

varying a voltage at which the electric current is fed, varying a protective resistor, varying a pull-off speed of the carbon fiber strand, or varying a spacing of current feed points of the electric current that is fed.

5. A device used to process a carbon fiber strand, comprising:

a heating device configured to feed electric current into a continuously conveyed carbon fiber strand in order to heat the carbon fiber strand, and wherein the carbon fiber strand is spread open and unraveled before feeding the electrical current into the carbon fiber strand.

6. The device according to claim 5, wherein the heating device comprises:

a voltage source;

at least two contact elements, each contact element being connected to a respective pole of the voltage source, wherein the at least two contact elements are insulated from an environment, the at least two contact elements are configured to contact the carbon fiber strand in order to form a closed circuit with the voltage source during the contact, and each contact element comprises a contact roller and/or a sliding contact.

7. The device according to claim 6, further comprising:

a control unit configured to control the voltage source.

8. The device according to claim 7, further comprising:

a temperature sensor configured to measure a final temperature of the carbon fiber strand; and wherein the control unit is configured to receive an output signal of the temperature sensor and to automatically control the final temperature of the carbon fiber strand by applying at least one of the following measures:

triggering the voltage source in order to vary an output voltage of the voltage source, triggering a variable resistor in order to vary a voltage between the at least two contact elements, triggering a servodrive in order to vary a spacing of the at least two contact elements, or triggering a drive in order to vary a pull-off speed of the carbon fiber strand.

9. The device according to claim 7, wherein the control unit controls the final temperature of the carbon fiber strand, the final temperature is a softening temperature $T_w$ of a coating or impregnation of fibers of the carbon fiber strand.

10. The device according to claim 7, wherein the control unit controls the final temperature of the carbon fiber strand, the final temperature is a disintegration temperature $T_z$ of a coating on fibers of the carbon fiber strand.

* * * * *